(12) United States Patent
Sayyed et al.

(10) Patent No.: US 12,541,611 B2
(45) Date of Patent: Feb. 3, 2026

(54) SYSTEM PARTITION SECURITY ASSURANCE TO PROTECT SYSTEM BOOT ARTIFACTS

(71) Applicant: DELL PRODUCTS L.P., Round Rock, TX (US)

(72) Inventors: Ibrahim Sayyed, Georgetown, TX (US); Venkata Rama Krishna Rao Atta, Hyderabad (IN); Laxmi Lavanya Medicherla, Georgetown, TX (US); Swapnil Keshavrao Patil, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 18/461,689

(22) Filed: Sep. 6, 2023

(65) Prior Publication Data

US 2025/0045438 A1 Feb. 6, 2025

(30) Foreign Application Priority Data

Aug. 2, 2023 (IN) .............................. 202311051959

(51) Int. Cl.
*G06F 21/62* (2013.01)
*G06F 21/57* (2013.01)

(52) U.S. Cl.
CPC ........ *G06F 21/6218* (2013.01); *G06F 21/575* (2013.01); *G06F 2221/034* (2013.01)

(58) Field of Classification Search
CPC .............. G06F 21/6218; G06F 21/575; G06F 2221/034; G06F 21/572; G06F 21/62
See application file for complete search history.

(56) References Cited

U.S. PATENT DOCUMENTS

| | | | |
|---|---|---|---|
| 9,495,535 B2 | 11/2016 | Suryanarayana et al. | |
| 10,366,224 B2 | 7/2019 | Kulkarni et al. | |
| 2017/0109531 A1* | 4/2017 | Wang | G06F 21/575 |
| 2018/0336342 A1* | 11/2018 | Narendra Trivedi | G06F 21/57 |
| 2021/0157584 A1* | 5/2021 | Souza | G06F 16/23 |

* cited by examiner

*Primary Examiner* — Quazi Farooqui
(74) *Attorney, Agent, or Firm* — Larson Newman, LLP

(57) ABSTRACT

An information handling system includes a memory device having a system partition, and a BIOS. The BIOS instantiates a file system during a boot phase of operation of the information handling system. The file system detects function calls to access the system partition and applies a policy to determine whether to grant the function calls access to the system partition.

16 Claims, 2 Drawing Sheets

SYSTEM PARTITION SECURITY ASSURANCE TO PROTECT SYSTEM BOOT ARTIFACTS

FIELD OF THE DISCLOSURE

This disclosure generally relates to information handling systems, and more particularly relates to system partition security assurance to protect system boot artifacts.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory device having a system partition, and a BIOS. The BIOS may instantiate a file system during a boot phase of operation of the information handling system. The file system may detect function calls to access the system partition and apply a policy to determine whether to grant the function calls access to the system partition.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
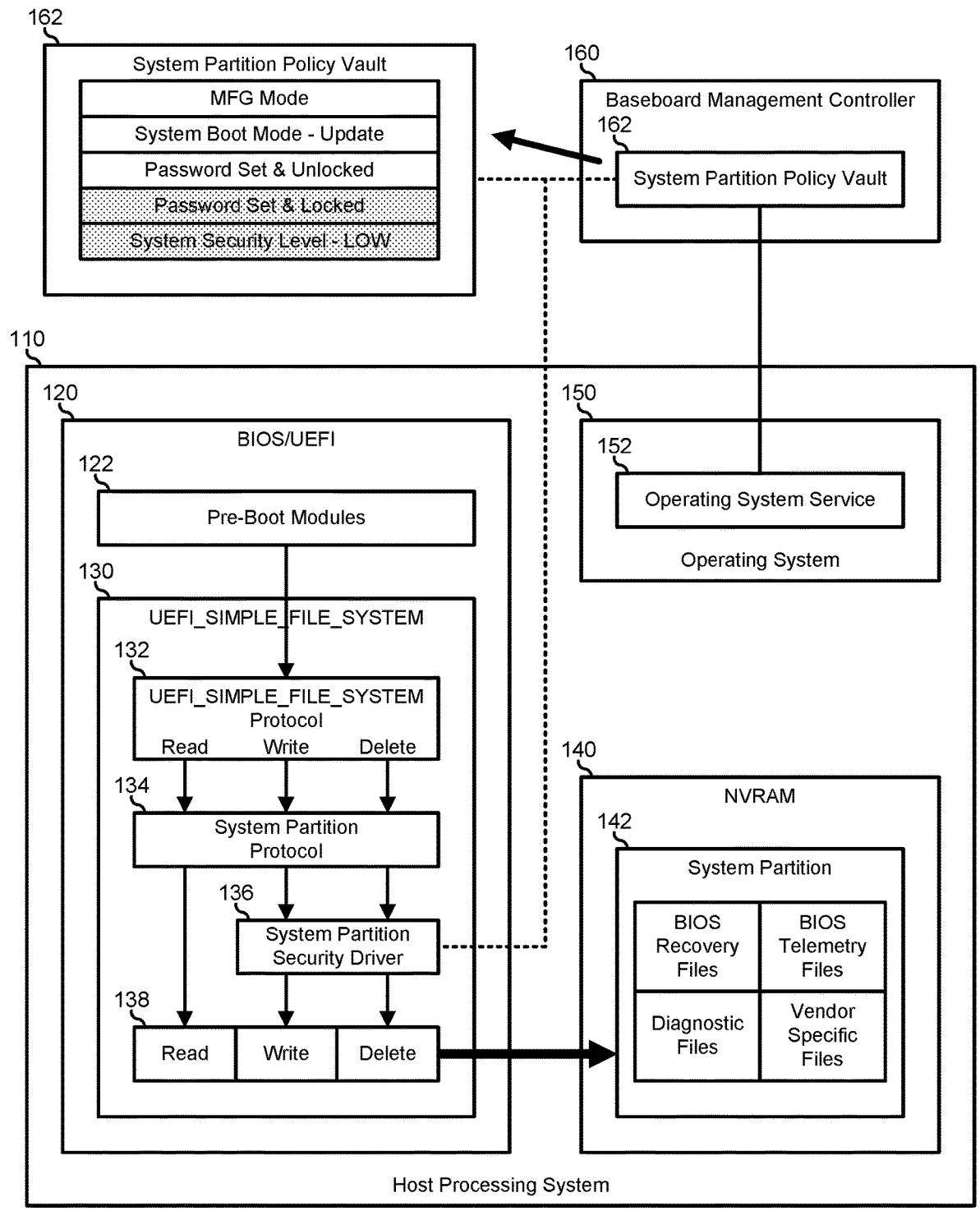
FIG. 1 is a block diagram of an information handling system according to an embodiment of the current disclosure.
Figure 2:
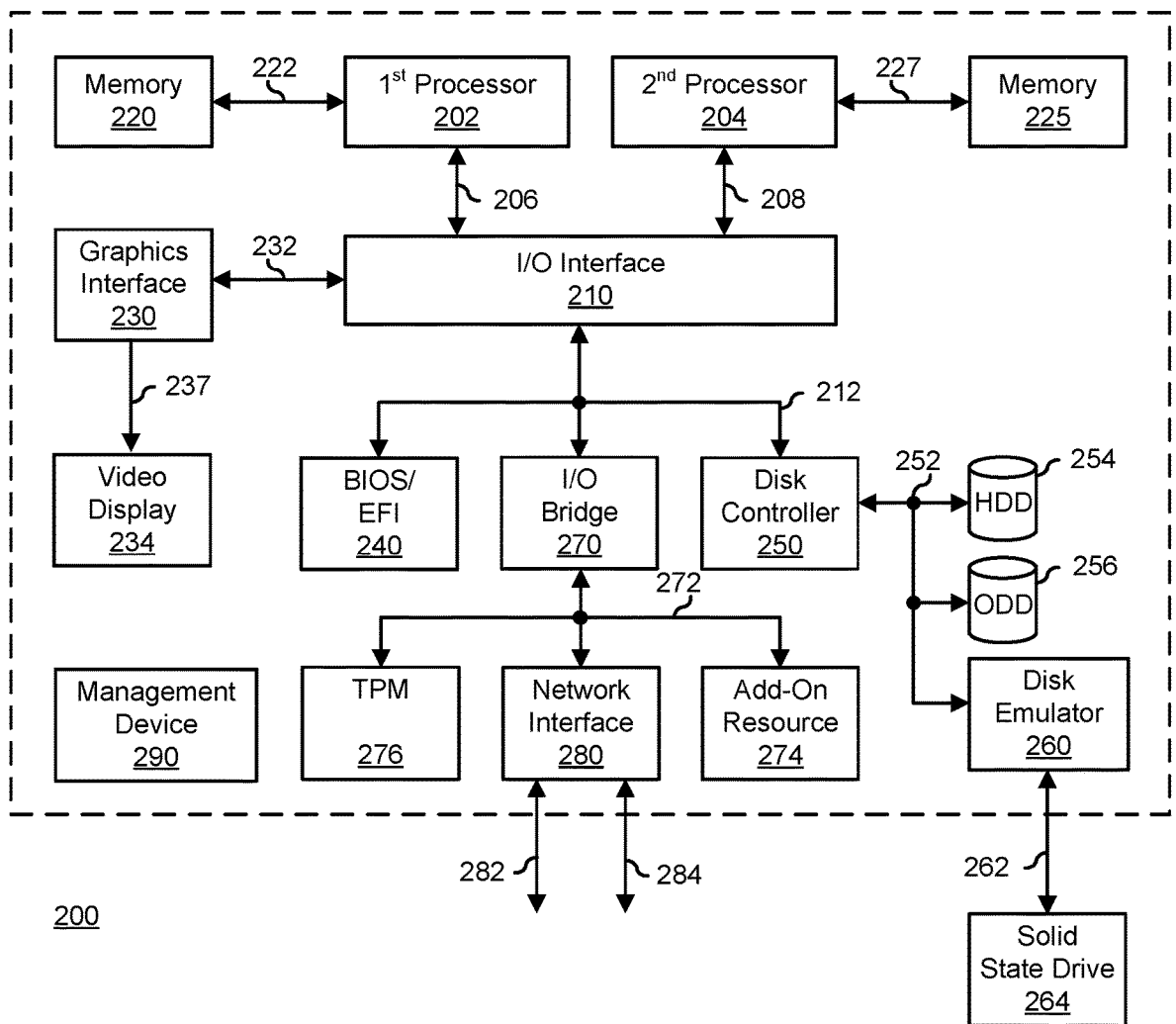
FIG. 2 is a block diagram illustrating a generalized information handling system according to another embodiment of the present disclosure.

FIG. 1 illustrates an information handling system 100 including a host processing system 110 and a baseboard management controller (BMC) 160. Information handling system 100 is similar to information handling system 200, as shown in FIG. 2 below. Host processing system 110 represents the elements of information handling system 100 that are typically associated with the operations for which the information handling system is utilized. As such, host processing system 110 may represent the hardware and firmware elements of information handling system 100, such as processors, memory, I/O hubs, storage devices, human interface devices, and the like. A basic input/output system (BIOS)/Universal Extensible Firmware Interface (UEFI) 120 and an operating system (OS) 150 are instantiated in host processing system 110, and the host processing system includes a non-volatile random access memory (NVRAM) 112 that stores data non-volatilely, that is, the data stored thereon remains when the host processing system is powered off. BIOS/UEFI 120 operates during a system boot phase of operation of information handling system 100 to initialize the hardware and firmware elements of host processing system 110, as described further below, and to launch OS 150 on the host processing system. During a run time phase of operation, BIOS/UEFI 120 operates to monitor, manage, and maintain low-level operations of the host processing system, as needed or desired.

BMC 160 represents a separate processing system implemented on information handling system 100 to monitor, manage, and maintain the operations of host processing system 110 and other non-processing related activities of the information handling system, such as thermal and power management, firmware updates, and the like. As such, BMC 160 operates out-of-band from the processing environment of host processing system 110. BMC 160, while not explicitly a part of host processing system 110, has access to the contents of NVRAM 140 to retrieve data stored thereon, as described further below.

NVRAM 140 includes a system partition 142 that stores various protected files and information utilized by BIOS/UEFI 120, OS 150, and vendor specific applications and utilities. For example, system partition 142 may store OS specific boot files such as bootx64.efi, bcd and, language pack files, BIOS recovery files that are used for OS recovery when OS 150 fails to boot successfully, BIOS telemetry files, BIOS and OS diagnostic files, and vendor specific recovery and telemetry files, as needed or desired.

It has been understood by the inventors of the current disclosure that operational failures in information handling system 100 are sometimes attributable to tampering with the contents of system partition 142. In particular the absence of BIOS/OS recovery files or other files, changes to the contents of the files, or the like result in system failures and the inability of information handling system 100 to recover from such failures. It is intended that the contents of system partition 142 are hidden and not generally accessible to users of information handling system 100 from an OS or otherwise without having administrative credentials that permit the manipulation of the contents of the system partition. However there are conditions where access to system partition 142 is granted, such as during the system boot process and when a BIOS secure boot option is not selected by the user. While such security options as the BIOS secure boot option are strongly recommended to the end user, they are not a requirement, and users can knowingly or inadvertently disable the BIOS secure boot option. Also, malicious code can be executed that turns off the BIOS secure boot option. In particular, known malware attacks target hosted bootloader files in system partition 142.

BIOS/UEFI 120 includes various pre-boot modules 122 and a UEFI Simple File System (UEFI_SIMPLE_FILE_SYSTEM) 130. Pre-boot modules 122 operate in the earliest stages of the system boot process and, early in the system boot process, UEFI Simple File System 130 is executed which grants to the system boot process access to function calls to read, write, delete, and otherwise manipulate files, so that subsequent processes can access the needed files and data to perform the rest of the system boot process. UEFI Simple File System 130 includes a UEFI Simple File System Protocol module 132, a system partition protocol module 134, a system partition security driver 136, and file access functions 138 (Read, Write, and Delete).

UEFI Simple File System protocol module 132 operates to receive function calls for accessing files within various storage media in host processing system 110, such as disk storage, NVRAM 140, and other storage media, as needed or desired. When the function calls are directed to storage media other than secure partition 142, the function calls are handled as needed or desired by the standards associated with UEFI Simple File System protocol module 132. However when the function calls are directed to system partition 142, UEFI Simple File System protocol module 132 forwards the function calls to system partition protocol 134 to direct the function calls to system partition 142. In particular, system partition protocol 134 operates to direct the function calls as described below. The typical system partition protocol may operate to direct all function calls to file access functions 138 without further processing, and the file access functions will typically execute the functions associated with the function calls (Read, Write, Delete) on system partition 142. Thus the typical UEFI Simple File System automatically processes any and all function calls on a system partition, and thus relies on other aspects of BIOS/UEFI operations (not described herein) to protect the contents of the system partition.

In the current embodiment, system partition protocol module 134 operates to bifurcate the processing of function calls to system partition 142 into two (2) separate flows. In a first flow, system partition protocol module 134 determines that a function call is a Read function call, and the system partition protocol module forwards the Read call directly to the associated file access function 138 (Read). In the second flow, system partition protocol module 134 determines that a function call is a Write function call or a Delete function call, and the system partition protocol module redirects the function call to system partition security driver 136 for further processing. In particular, system partition security driver 136 implements a policy based decision as to whether or not to forward Write function calls and Delete function calls to the associated file access function 138 (Write or Delete), or to drop the Write function calls and Delete function calls. In a particular embodiment, system partition security driver 136 includes a system partition policy vault 162 that provides a static policy table for accessing system partition 142.

In the illustrated example, entries of system partition policy vault 162 are provided that permit the associated function calls to proceed on system partition 142 (illustrated here as unshaded blocks), and that restrict the associated function calls from proceeding on the system partition (illustrated here as shaded blocks). Particularly, Write function calls and Delete function calls are permitted when a) information handling system 100 is in a manufacturing mode, b) when the information handling system is in the system boot phase and the system boot phase is a system update boot cycle, and c) when a password is set but is unlocked. On the other hand, Write function calls and Delete function calls are not permitted when a) the password is set and is locked, and b) the system security level is low, such as when the secure boot option is disabled. A static system partition policy vault similar to system partition policy vault 162 may include additional or different entries as needed or desired, may provide policies for other types of function calls, such as Read function calls, and may provide separate policy actions for the various types of function calls, as needed or desired.

In a particular embodiment as described further below, system partition policy vault 162 resides in BMC 160. In a first case, wherever system partition policy driver 136 receives a function call, the system partition policy driver directs a query to BMC 160 to consult system partition policy vault 162 to determine the appropriate action to take with the received function call. In another case BMC 160 operates to provide system partition policy vault 162 to a memory location accessible to system partition security driver 136, such as in a mailbox location in NVRAM 140, and the system partition security driver accesses the mailbox to determine the correct policy. By maintaining system partition policy vault 162 in BMC 160, the BMC can operate to process requests to update the contents of system partition 142. In particular, BMC 160 operates to maintain the wall between OS 150 and any activity that would attempt to perform barred transactions with system partition 142. For example OS service 152 may operate to trap Write function calls or Delete function calls to system partition 142, and forward them to BMC 160 for evaluation. If BMC 160 determines that such a function call is valid, then the BMC operates to modify system partition policy vault 162 as needed or desired.

FIG. 2 illustrates a generalized embodiment of an information handling system 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware. Information handling system 200 can also include one or more computer-readable medium for storing machine-executable code, such as software or data. Additional components of information handling system 200 can include one or more storage devices that can store machine-executable code, one or more communications ports for communicating with external devices, and various input and output (I/O) devices, such as a keyboard, a mouse, and a video display. Information handling system 200 can also include one or more buses operable to transmit information between the various hardware components.

Information handling system 200 can include devices or modules that embody one or more of the devices or modules described below, and operates to perform one or more of the methods described below. Information handling system 200 includes a processors 202 and 204, an input/output (I/O) interface 210, memories 220 and 225, a graphics interface 230, a basic input and output system/universal extensible firmware interface (BIOS/UEFI) module 240, a disk controller 250, a hard disk drive (HDD) 254, an optical disk drive (ODD) 256, a disk emulator 260 connected to an external solid state drive (SSD) 262, an I/O bridge 270, one or more add-on resources 274, a trusted platform module (TPM) 276, a network interface 280, a management device 290, and a power supply 295. Processors 202 and 204, I/O interface 210, memory 220, graphics interface 230, BIOS/UEFI module 240, disk controller 250, HDD 254, ODD 256, disk emulator 260, SSD 262, I/O bridge 270, add-on resources 274, TPM 276, and network interface 280 operate together to provide a host environment of information handling system 200 that operates to provide the data processing functionality of the information handling system. The host environment operates to execute machine-executable code, including platform BIOS/UEFI code, device firmware, operating system code, applications, programs, and the like, to perform the data processing tasks associated with information handling system 200.

In the host environment, processor 202 is connected to I/O interface 210 via processor interface 206, and processor 204 is connected to the I/O interface via processor interface 208. Memory 220 is connected to processor 202 via a memory interface 222. Memory 225 is connected to processor 204 via a memory interface 227. Graphics interface 230 is connected to I/O interface 210 via a graphics interface 232, and provides a video display output 236 to a video display 234. In a particular embodiment, information handling system 200 includes separate memories that are dedicated to each of processors 202 and 204 via separate memory interfaces. An example of memories 220 and 230 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 240, disk controller 250, and I/O bridge 270 are connected to I/O interface 210 via an I/O channel 212. An example of I/O channel 212 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 210 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 240 includes BIOS/UEFI code operable to detect resources within information handling system 200, to provide drivers for the resources, initialize the resources, and access the resources. BIOS/UEFI module 240 includes code that operates to detect resources within information handling system 200, to provide drivers for the resources, to initialize the resources, and to access the resources.

Disk controller 250 includes a disk interface 252 that connects the disk controller to HDD 254, to ODD 256, and to disk emulator 260. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 260 permits SSD 264 to be connected to information handling system 200 via an external interface 262. An example of external interface 262 includes a USB interface, an IEEE 2394 (Firewire) interface, a proprietary interface, or a combination thereof. Alternatively, solid-state drive 264 can be disposed within information handling system 200.

I/O bridge 270 includes a peripheral interface 272 that connects the I/O bridge to add-on resource 274, to TPM 276, and to network interface 280. Peripheral interface 272 can be the same type of interface as I/O channel 212, or can be a different type of interface. As such, I/O bridge 270 extends the capacity of I/O channel 212 when peripheral interface 272 and the I/O channel are of the same type, and the I/O bridge translates information from a format suitable to the I/O channel to a format suitable to the peripheral channel 272 when they are of a different type. Add-on resource 274 can include a data storage system, an additional graphics interface, a network interface card (NIC), a sound/video processing card, another add-on resource, or a combination thereof. Add-on resource 274 can be on a main circuit board, on separate circuit board or add-in card disposed within information handling system 200, a device that is external to the information handling system, or a combination thereof.

Network interface 280 represents a NIC disposed within information handling system 200, on a main circuit board of the information handling system, integrated onto another component such as I/O interface 210, in another suitable location, or a combination thereof. Network interface device 280 includes network channels 282 and 284 that provide interfaces to devices that are external to information handling system 200. In a particular embodiment, network channels 282 and 284 are of a different type than peripheral channel 272 and network interface 280 translates information from a format suitable to the peripheral channel to a format suitable to external devices. An example of network channels 282 and 284 includes InfiniBand channels, Fibre Channel channels, Gigabit Ethernet channels, proprietary channel architectures, or a combination thereof. Network channels 282 and 284 can be connected to external network resources (not illustrated). The network resource can include another information handling system, a data storage system, another network, a grid management system, another suitable resource, or a combination thereof.

Management device 290 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 200. In particular, management device 290 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 200, such as system cooling fans and power supplies. Management device 290 can include a network connection to an external management system, and the management device can communicate with the management system to report status information for information handling system 200, to receive BIOS/UEFI or system firmware updates, or to perform other task for managing and controlling the operation of information handling system 200. Management device 290 can operate off of a separate power plane from the components of the host environment so that the management device receives power to manage information handling system 200 when the information handling system is otherwise shut down. An example of management device 290 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 290 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a memory device including a system partition; and
a basic input/output system configured to instantiate a file system during a boot phase of operation of the information handling system, the file system configured to detect function calls to access the system partition, to apply a policy to determine whether to grant the function calls access to the system partition, wherein, in applying the policy, the file system is further configured to determine that the information handling system is in a manufacturing mode and in response to grant the function calls to the system partition, wherein the function calls include read calls, write calls, and delete calls.

2. The information handling system of claim 1 wherein, in applying the policy, the file system is further configured to determine that the information handling system is in a system update mode, and in response, to grant the function calls to the system partition.

3. The information handling system of claim 1 wherein, in applying the policy, the file system is further configured to determine that the information handling system has a password set and unlocked, and in response, to grant the function calls to the system partition.

4. The information handling system of claim 1 wherein, in applying the policy, the file system is further configured to determine that the information handling system has a password set and locked, and in response, to not grant the function calls to the system partition.

5. The information handling system of claim 1 wherein, in applying the policy, the file system is further configured to determine that the information handling system has a secure boot option disabled, and in response, to not grant the function calls to the system partition.

6. The information handling system of claim 1 wherein, when the function calls are read calls, the file system is further configured to grant the read calls.

7. The information handling system of claim 1 wherein, when the function calls are write calls, the file system is further configured to not grant the write calls.

8. The information handling system of claim 1 wherein, when the function calls are delete calls, the file system is further configured to not grant the delete calls.

9. A method, comprising:
providing, on a memory device of an information handling system, system partition;
instantiating, on a basic input/output system of the information handling system, a file system during a boot phase of operation of the information handling system;
detecting, by the file system, function calls to access the system partition, wherein the function calls include read calls, write calls, and delete calls; and
applying a policy to determine whether to grant the function calls access to the system partition, wherein, in applying the policy, the method further comprises:
determining, by the file system, that the information handling system is in a system update mode; and
in response, granting the function calls to the system partition.

10. The method of claim 9 wherein, in applying the policy, the method further comprises:
determining, by the file system, that the information handling system is in a manufacturing mode; and
in response, granting the function calls to the system partition.

11. The method of claim 9 wherein, in applying the policy, the method further comprises:
determining, by the file system, that the information handling system has a password set and unlocked; and
in response, granting the function calls to the system partition.

12. The method of claim 9 wherein, in applying the policy, the method further comprises:
determining, by the file system, that the information handling system has a password set and locked; and
in response, denying the function calls access to the system partition.

13. The method of claim 9 wherein, in applying the policy, the method further comprises:
determining, by the file system, that the information handling system has a secure boot option disabled; and
in response, denying the function calls access to the system partition.

14. The method of claim 9 wherein, when the function calls are read calls, the method further comprises:
granting, by the file system, the read calls.

15. The method of claim 9 wherein, when the function calls are write calls and delete calls, the method further comprises:
- denying, by the file system, the write calls and delete calls.

16. An information handling system, comprising:
- a baseboard management controller (BMC);
- a memory device including a system partition; and
- a basic input/output system configured to instantiate a file system during a boot phase of operation of the information handling system, the file system configured to detect function calls to access the system partition and to apply a policy to determine whether to grant the function calls access to the system partition, wherein the policy is received from the BMC, wherein, in applying the policy, the file system is further configured to determine that the information handling system is in a system update mode and in response to grant the function calls to the system partition, wherein the function calls include read calls, write calls, and delete calls.

* * * * *